Patented Oct. 8, 1946

2,408,889

UNITED STATES PATENT OFFICE 2,408,889

PRODUCTION OF ORGANIC COMPOUNDS

Nancy Short, Runcorn, England, assignor to Imperial Chemical Industries Limited, a corporation of Great Britain No Drawing. Application December 14, 1944, Serial No. 568,215. In Great Britain January 12, 1944

6 Claims. (Cl. 260—486)

This invention relates to improvements in the production of organic compounds, and more particularly to the production of acrylic acid and its esters.

According to the present invention, a process for the production of acrylic acid or an ester thereof comprises the step of reacting vinylidene chloride with formaldehyde or a polymer thereof in the presence of aqueous sulphuric acid.

Concentrated sulphuric acid itself reacts with vinylidene chloride at ordinary temperatures and thus in order that reaction may take place to a satisfactory extent between the latter and the formaldehyde it has been found advantageous to employ a sufficiently dilute acid to eliminate the risk of the occurrence of a reaction between the sulphuric acid and vinylidene chloride. Hence in the manufacture of acrylic acid according to the most advantageous form of the present invention contact between vinylidene chloride and aqueous sulphuric acid containing more than 85% $H_2SO_4$ is avoided. Preferably the aqueous acid has a concentration of between 65% and 70%, though much more dilute acid, for example acid containing only 50% $H_2SO_4$ and even less, may be used. When acid of more than 85% concentration is used, some acrylic acid is formed, but poorer yields are obtained with the stronger acid.

In one form of the invention, the process is carried out in a vessel provided with a stirrer, an inlet for the reactants, an outlet through a reflux condenser by which hydrogen chloride can escape, and with heating and cooling means. The reaction vessel is charged with aqueous sulphuric acid containing, suitably, 65% to 70% sulphuric acid, and vinylidene chloride is added. The ratio of the vinylidene chloride to sulphuric acid may be varied considerably, although it is desirable to have a fairly large proportion of the acid, for example, an amount containing a weight of 100% acid from 1 to 3 times that of the vinylidene chloride, in order that the acid may not become too dilute for the reaction to proceed while there are still present, unchanged, both vinylidene chloride and formaldehyde. The formaldehyde, suitably as formalin or as a slurry of paraformaldehyde in water, is then added gradually to the mixture of aqueous sulphuric acid and vinylidene chloride, the rate of addition being regulated so that a steady evolution of hydrogen chloride occurs. Approximately equimolecular proportions of vinylidene chloride and formaldehyde may suitably be used, no advantage apparently being gained by using an excess of either.

It is advantageous, however, to avoid the use of an excess of formaldehyde, since this tends to cause uncontrollable frothing to occur during a subsequent steam distillation. When the formaldehyde is added in admixture with water, that is as formalin or as a slurry of paraformaldehyde, in water, it is particularly desirable that a fairly large excess of sulphuric acid should be present. The reaction may be carried out at room temperature or at slightly higher temperatures; preferably the temperature is kept below 30° C. when the reaction is carried out by the method described above. If it is desired to employ higher temperatures the reaction must be carried out in a pressure vessel to prevent the rapid escape of vinylidene chloride.

As an alternative method of carrying out the reaction between vinylidene chloride and formaldehyde, instead of mixing the vinylidene chloride with the aqueous sulphuric acid and subsequently adding formalin or a slurry of paraformaldehyde, concentrated sulphuric acid or oleum may be mixed with formalin or with a slurry of paraformaldehyde so that diluted acid is formed either containing formaldehyde in solution or paraformaldehyde in suspension as the case may be, and the vinylidene chloride may be added to it gradually at reaction temperature. This method is advantageous in that the danger of frothing is eliminated. In employing this alternative procedure, it is unnecessary to dilute the sulphuric acid with water in the first place if formalin or a slurry of paraformaldehyde in water is used, since the water thus added with the formaldehyde is sufficient for the purpose. Thus, 98% sulphuric acid and 40% formalin may be mixed in the reaction vessel in suitable proportions, and the vinylidene chloride added subsequently. Although the amount of sulphuric acid used may be varied over a wide range of proportions, it has been found that when the ratio of sulphuric acid to formaldehyde is less than that given by using approximately 240 parts by volume of 98% sulphuric acid to 300 parts by volume of 40% formalin, that is approximately 442 parts by weight of 98% sulphuric acid to 120 parts by weight of formaldehyde, the reaction proceeds very slowly.

If desired, the reaction vessel may be cooled so that the temperature does not rise above the boiling point of vinylidene chloride: thus it may be maintained at approximately room temperature, that is between 15° C. and 25° C. Alternatively, when the second method described above is employed the reaction may be carried out at temperatures above the boiling point of vinylidene chloride, for example at 50° C. to 60° C. or even higher temperatures, provided that an adequate reflux condenser is employed, so that vinylidene chloride vapour can be condensed and the condensate allowed to fall back into the reaction mixture. It has been found that the optimum temperature for the reaction is that obtained by externally heating the reaction vessel to approximately 55° C. to 60° C., since the use of temperatures within this range gives a conveniently rapid reaction while the condensation is adequate. The actual temperature of the reaction mixture fluctuates considerably, as a result of the constant addition of cold vinylidene chloride and of condensate, so that while the reaction vessel is heated by means of a bath or jacket, or other suitable means, maintained at 55° C. to 60° C., the temperature of the reaction mixture may fluctuate for example, between 30° C. and 60° C. The reaction takes place very much more slowly at lower temperatures. When the last portion of vinylidene chloride has been added to the formaldehyde-sulphuric acid mixture and the evolution of hydrogen chloride has ceased, the reaction mixture may be kept at the reaction temperature for a short time, to ensure completion of the reaction.

In the preferred method of carrying out the reaction, a quantity of formalin containing 120 parts by weight of formaldehyde and 204 parts by weight of water is mixed with approximately 736 parts by weight of 98% sulphuric acid while cooling, and the reaction vessel is then warmed to an external temperature of 55° C. to 60° C. and stirred to give good contact between the liquid and vapour phases, while approximately 388 parts by weight of vinylidene chloride are added over a period of 1½ to 2 hours. After the addition of the vinylidene chloride, the temperature may be raised, for example to about 80° C., for a short time, to ensure that the reaction is complete.

After completion of the reaction, carried out by any of the methods described above, arcylic acid is obtained from the reaction mixture by steam distillation, steam being passed through the mixture either in the reaction vessel or in a different vessel, and the distillate being collected in a suitable receiver containing a polymerisation inhibitor, such as thymol. The resulting aqueous solution containing acrylic acid may then be treated to recover acrylic acid therefrom either in the monomeric or the polymeric form. Thus the polymeric acid may be made by evaporating water from the solution at ordinary pressures until a viscous concentrated solution remains, which may be poured on to shallow trays and further heated to drive off the remaining water. Alternatively the aqueous solution of acrylic acid produced in this way may be used directly in the production of interpolymers with a second polymerisable compound, such as vinyl chloride.

An ester of acrylic acid may be prepared from the crude reaction mixture obtained as described above, by heating and adding the appropriate alcohol. Alternatively it is possible to obtain the ester by carrying out the reaction between vinylidene chloride and formaldehyde in the presence of the corresponding alcohol. Thus the sulphuric acid may be diluted with the alcohol, and either the vinylidene chloride may be mixed with the sulphuric acid and alcohol and the formaldehyde added gradually, or the formaldehyde may be added first and then the vinylidene chloride added slowly. In either case the presence of water is essential for the desired reaction to take place, so that it is necessary to use either aqueous sulphuric acid or formaldehyde mixed with water in the form of formalin or an aqueous slurry of paraformaldehyde, as in the preparation of acrylic acid. I have found, however, that the yields of esters obtained by this alternative method are not very satisfactory, and that considerably better yields are obtained by methods involving the esterification of the crude reaction mixture resulting from the reaction between formaldehyde and vinylidene chloride in the presence of aqueous sulphuric acid as already described.

It appears that the crude reaction mixture may contain an intermediate compound, possibly an acid sulphate of acrylic acid, or more probably a mixture of intermediate compounds, which on heating is decomposed to give acrylic acid if water is present, or an acrylic ester if an alcohol is present in addition. In the case of the preparation of the free acid, this decomposition is readily accomplished by means of steam distillation. In preparing the esters, however, I have found that the addition of an alcohol to the reaction mixture after heating the mixture to a suitable temperature, say to about 120° C. to 150° C., followed by refluxing, produces the ester only in rather low yield. Much better results are obtained by simultaneously heating the mixture and adding the alcohol, over a considerable period of time, while distilling off the ester as it is formed.

In the preferred method of preparing an ester of acrylic acid, suitably a lower alkyl ester such as ethyl acrylate, a vessel provided with a stirrer, an inlet for alcohol and an outlet line to a condenser is charged with a quantity of the crude reaction mixture obtained by reacting vinylidene chloride with formaldehyde in the presence of sulphuric acid. This mixture contains a fairly large excess of sulphuric acid and it is desirable to neutralise at least part of this acid prior to esterification; this is suitably effected by the gradual addition of soda ash. If desired, a small amount of a polymerisation inhibitor, preferably copper oxide, may also be added to the mixture. The vessel is then heated to a temperature within the approximate range of 140° C. to 180° C. and is maintained within that range while an alcohol such as ethyl alcohol is added gradually over a period of time, for example up to eight hours or longer. Simultaneously with the addition of the alcohol, the product of the esterification is distilled, the distillate being collected in fractions. The heating and addition of alcohol are continued until analysis of the fractions collected indicates that the distillate no longer contains an appreciable amounter of ester.

If desired, the production of an ester may be carried out in a plurality of vessels connected in series, instead of in one vessel only. For example, three vessels may be used, all fitted with stirrers, and the first in the series being provided with an inlet for alcohol and an outlet tube connected to the inlet tube of the second vessel, the outlet from which is similarly connected to the inlet of the third vessel, which has an outlet to a condenser and receiver. The crude reaction mixture to be esterified is divided between the three vessels, the contents of each vessel may be treated with soda ash, copper oxide is added if desired, and the three vessels are heated simultaneously to 140° C. to 180° C. while alcohol is added gradually to the contents of the first and the product distils off from the third vessel.

The crude distillate obtained from the esterification process contains, besides the ester and unreacted alcohol, some acrylic acid, water and usually small quantities of a chlorine-containing substance and other impurities. Ester which is free from most of these impurities can be obtained by fractional distillation of the distillate or of the separate fractions collected during the esterification, after treating with a stabiliser such as hydroquinone. It has proved to be somewhat difficult to effect complete separation of the ester from the alcohol. However, when the ester is used for granular and emulsion polymerisation or interpolymerisation processes, the presence of the alcohol has not been found to be objectionable.

The following examples illustrate but do not limit the invention, all parts being by weight unless otherwise stated.

*Example 1*

276 parts of 98% sulphuric acid and 43 parts of water were mixed, with cooling, in a vessel fitted with a sealed stirrer, means for admitting the reactants at a controlled rate, and a reflux coil condenser. When the temperature had fallen below 30° C., 100 parts of vinylidene chloride were added. 30 parts of paraformaldehyde were slurried with 36 parts of water and the slurry was added gradually over a period of 2 hours while the reaction mixture was stirred vigorously, the mixture being warmed towards the end of the addition. The last traces of hydrogen chloride were removed by air blowing, and the reaction mixture was transferred to a larger vessel and steam distilled. The distillate contained 56 parts of acrylic acid.

To obtain polymerised acrylic acid, 0.5 part of ammonium persulphate was added to the aqueous distillate, and water was distilled off until the residue was a slightly yellow syrupy solution, which was then transferred to an open dish, and the remainder of the water was evaporated off, leaving a glassy resin.

*Example 2*

The reaction vessel employed was fitted with means for admitting liquids at a controlled rate, a reflux coil condenser leading to an absorption tower for hydrogen chloride, and a sealed stirrer designed to give the maximum amount of splashing in the reaction mixture to give adequate contact between the liquid and vapour phases. 120 parts of formaldehyde and 204 parts of water, as 40% formalin, were charged into the reaction vessel, and 736 parts of 98% sulphuric acid were added slowly with cooling. It was necessary to avoid overheating during this operation to prevent the formation of paraformaldehyde in the upper part of the reaction vessel and in the condenser. The condenser was then cooled to —40° C., and 400 parts of vinylidene chloride were added over a period of 2 hours, with vigorous stirring, while the reaction vessel was maintained at an external temperature of 55° C. to 60° C. When the addition of the vinylidene chloride was complete, the temperature of the vessel was raised to 80° C. The reaction mixture was then steam distilled directly, and an aqueous solution of acrylic acid was obtained as the distillate.

*Example 3*

A crude reaction mixture was obtained by the method described in Example 2, omitting the steam distillation step, 582 parts of vinylidene chloride being added to a mixture of 1104 parts of 98% sulphuric acid with 180 parts of formaldehyde and 306 parts of water over 1¾ hours. 2 parts of copper oxide were added to the mixture. The vessel containing the crude reaction mixture was fitted with an inverted condenser and a sealed stirrer, and 335 parts of soda ash were added to the mixture in small portions. Lachrymatory fumes passed off with the carbon dioxide at this stage and were condensed. This "preliminary distillate" was discarded. The vessel was heated to 160° C. to 170° C. and was maintained at this temperature while 474 parts of ethyl alcohol were added, over a period of 8 hours. The product distilled continuously and was collected in fractions. The total distillate contained 736 parts of ethyl acrylate, representing a 63% yield of the ester, based on the vinylidene chloride used.

*Example 4*

A crude reaction mixture was prepared as described in Examples 2 and 3, using the quantities of reactants employed in Example 3, and was divided between three vessels connected in series in amounts of 250, 450 and 430 parts by volume respectively. The first vessel was provided with an inlet for alcohol, and the outlet from the third vessel led to an inverted condenser and receiver. Soda ash in amounts of 72, 130 and 130 parts respectively were added to the contents of the three vessels before they were connected. 553 parts of ethyl alcohol were admitted slowly to the first vessel over a period of 6½ hours, while the three vessels were maintained at a temperature of 158° C. to 164° C. The product distilled from the third vessel and was collected in fractions, the bulk of the ester produced distilling over in the first four hours. The distillate fractions separated into two layers, and the organic layers of the various fractions were combined and redistilled, the ethyl acrylate fractions boiling between 90° C. and 98° C. being collected. The yield of ethyl acrylate obtained was 63% of the theoretical, based on the vinylidene chloride used in the reaction.

*Example 5*

The reaction mixture was prepared by the method described in Example 2, 776 parts of vinylidene chloride being added slowly to a mixture of 1472 parts of 98% sulphuric acid, 240 parts of formaldehyde and 408 parts of water. The mixture was treated with 440 parts of soda ash, and 637 parts of methyl alcohol were added over a period of 7 hours, while the reaction vessel was maintained at a temperature of 157° C. to 168° C. 630 parts of distillate were obtained, apart from the "preliminary distillate" which was rejected. The distillate separated into two layers, and the organic layer contained 447 parts of methyl acrylate, representing 65% of the theoretical yield.

The product was washed with saturated salt solution, and the remaining organic layer was treated with calcium chloride and distilled. The main fraction boiled at 76° C. to 80° C., and a saponification test indicated that this fraction contained 94% methyl acrylate.

*Example 6*

A reaction mixture prepared as described in Example 3 was treated with 100 parts of soda ash, and 162 parts of n-butyl alcohol were added during 2 hours, while the reaction mixture was maintained at a temperature of 165° C. to 170° C. 206 parts of distillate were obtained, containing 24 parts of acrylic acid and 100 parts of butyl acrylate, as indicated by acidity and hydrolysis tests.

I claim:

1. A process for the production of an acrylyl compound which comprises adding vinylidene chloride to a mixture of sulfuric acid and a member of the group consisting of formaldehyde and polymers thereof, said mixture containing an amount of water such that the concentration of the sulfuric acid is not greater than 85%, and the ratio of 98% sulfuric acid to formaldehyde, by weight, contained in the mixture is at least 442 to 120, the reaction mixture being maintained at a temperature between 30° C. and 60° C. during the addition of vinylidene chloride.

2. The process as defined in claim 1 in which the vinylidene chloride and the formaldehyde are reacted in substantially equimolecular proportions.

3. The process as defined in claim 1 in which the acrylyl compound is removed from the products of the reaction by steam distillation.

4. The process as defined in claim 1 in which the said mixture contains an amount of water such that the concentration of sulfuric acid is between 65% and 70%.

5. A process for the production of an acrylyl compound which comprises adding vinylidene chloride to a mixture of sulfuric acid and a member of the group consisting of formaldehyde and polymers thereof, said mixture containing an amount of water such that the concentration of the sulfuric acid is not greater than 85%, and the ratio of 98% sulfuric acid to formaldehyde, by weight, contained in the mixture is at least 442 to 120, the reaction mixture being maintained at a temperature between 30° C. and 60° C. during the addition of vinylidene chloride, heating said reaction mixture to a temperature between 140° C. and 180° C., adding an alcohol to said mixture to form an acrylic acid ester, and continuously distilling off said ester as it is formed.

6. A process for the production of an acrylyl compound which comprises adding vinylidene chloride to a mixture of sulfuric acid and a member of the group consisting of formaldehyde and polymers thereof, said mixture containing an amount of water such that the concentration of the sulfuric acid is not greater than 85%, and the ratio of 98% sulfuric acid to formaldehyde, by weight, contained in the mixture is at least 442 to 120, the reaction mixture being maintained at a temperature between 30° C. and 60° C. during the addition of vinylidene chloride, neutralizing at least a part of the sulfuric acid with soda ash, heating said reaction mixture to a temperature between 140° C. and 180° C., adding an alcohol to said mixture to form an acrylic acid ester, and continuously distilling off said ester as it is formed.

NANCY SHORT.